United States Patent [19]

Kokubu

[11] Patent Number: 5,500,637
[45] Date of Patent: Mar. 19, 1996

[54] ABNORMAL CONDITION SIGNAL TRANSMITTING DEVICE FOR A ROTATING BODY

[75] Inventor: Sadao Kokubu, Aichi, Japan

[73] Assignee: Kabushiki Kaisha Tokai Rika Denki Seisakusho, Aichi, Japan

[21] Appl. No.: 199,951

[22] Filed: Feb. 22, 1994

[30] Foreign Application Priority Data

Feb. 22, 1993 [JP] Japan .................................. 5-005833 U
Feb. 22, 1993 [JP] Japan .................................. 5-005834 U
Feb. 22, 1993 [JP] Japan ...................................... 5-031625

[51] Int. Cl.$^6$ .................................................. B60C 23/00
[52] U.S. Cl. ........................... 340/447; 340/442; 340/445; 340/825.69; 340/425.5; 73/146.5
[58] Field of Search .................................. 340/447, 442, 340/445, 425.5, 426, 825.69, 825.72, 539, 517, 521; 73/146.2, 146.4, 146.5, 146.8; 11/11

[56] References Cited

U.S. PATENT DOCUMENTS

| | | | |
|---|---|---|---|
| 3,588,815 | 6/1971 | Koonce | 340/447 |
| 3,803,550 | 4/1974 | Mirsky | 340/447 |
| 4,286,253 | 8/1981 | Nagy | 340/447 |
| 4,694,273 | 9/1987 | Franchino | 340/447 |
| 4,897,630 | 1/1990 | Nykerk | 340/426 |

FOREIGN PATENT DOCUMENTS

| | | |
|---|---|---|
| 0291412A1 | 11/1988 | European Pat. Off. . |
| 2286031 | 4/1976 | France . |
| 3341900A1 | 5/1985 | Germany . |

*Primary Examiner*—Donnie L. Crosland
*Attorney, Agent, or Firm*—Finnegan, Henderson, Farabow, Garrett & Dunner

[57] ABSTRACT

A tire abnormal condition alarming system for a vehicle includes a remote control device including: a signal receiver for receiving receive a door unlocking or locking aerial propagation signal from an operating key; a door locking mechanism operated according to the signal reception of the signal receiver; and a signal transmitter coupled to a tire of the motor vehicle, the signal transmitter detecting an abnormal condition of the body of revolution to transmit an abnormal condition detection signal as an aerial propagation signal to the signal receiver, an alarming device for performing a warning operation to inform the occurrence of the abnormal condition with the vehicle by operating the signal receiver upon reception of the abnormal condition detection signal from the signal transmitter.

6 Claims, 5 Drawing Sheets

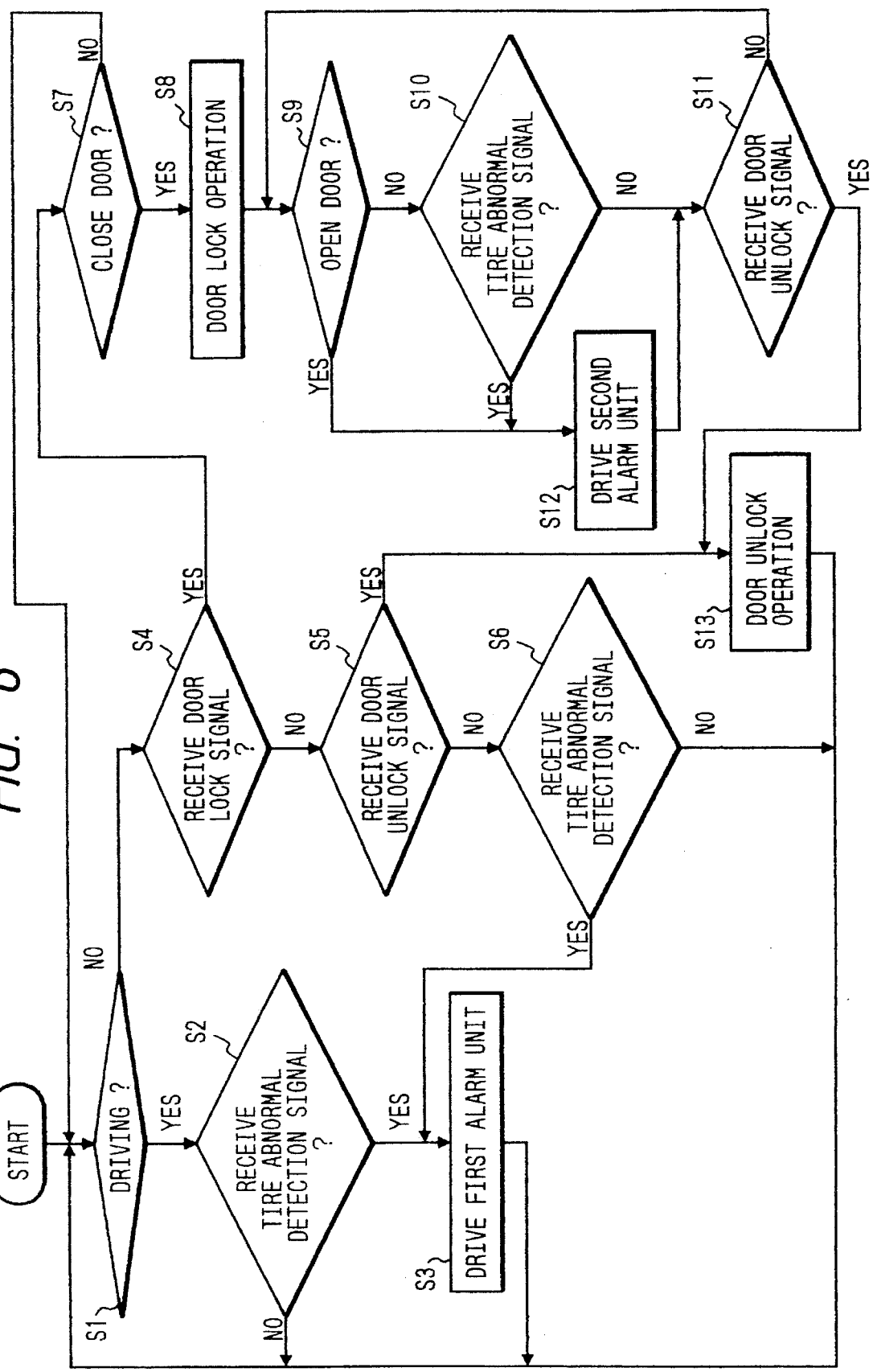

ABNORMAL CONDITION SIGNAL TRANSMITTING DEVICE FOR A ROTATING BODY

BACKGROUND OF THE INVENTION

1. Field of the Invention

This invention relates to an abnormal condition signal transmitting device for a body of revolution such as a tire which transmits an aerial propagation signal to indicate the occurrence of an abnormal condition with the body of revolution. The invention, further, relates to a tire abnormal condition detecting device which detects the state of the hub nuts which secure a tire to the hub of the axle of a motor vehicle or the like. The invention, still more, relates to a tire abnormal condition alarming device for a motor vehicle which is provided with a remote control device including a signal receiver adapted to receive a door unlocking or locking aerial propagation signal from an operating key, in which a door locking mechanism is operated in response to the signal received by the signal receiver, to unlock or lock a door.

2. Related Art

One example of an abnormal condition signal transmitting device of this type is designed as follows: That is, the device is coupled to a tire. Upon detection of the abnormal condition of the tire, the device transmits an abnormal condition detection signal as an aerial propagation signal, and when a signal receiver receives the abnormal condition detection signa, informing means or the like is operated to inform the user of the occurrence of the abnormal condition. More specifically, the abnormal condition signal transmitting device coupled to the tire operates to detect the loosening of the hub nuts or the reduction of the air pressure of the tire, to output the abnormal condition detection signal.

The device is designed for instance as follows: Contact pieces are interposed between the tire wheel and the hub nuts adapted to fix the latter, thus forming abnormal condition detecting switches. When the hub nuts have been suitably fixed, the contact pieces are grounded through the wheel and the hub, and therefore the switches are held turned on. And when the hub nuts are loosened to electrically disconnect the contact pieces from the tire wheel, the switches are turned off. Furthermore, an air pressure sensor is coupled to the tire, and another abnormal condition detecting switch is provided which is turned off when the air pressure of the tire detected by the air pressure sensor is lower than a predetermined value.

When, in the abnormal condition signal transmitting device thus constructed, those abnormal condition detecting switches are turned off, transistors provided for the latter are turned on to provide abnormal condition detection signals, respectively.

The above-described conventional device suffers from the following difficulties: When the abnormal condition detecting switches detect the abnormal condition, the outputs of the switches change from ground level floating level to turn on the transistors. For this purpose, it is necessary to ground the circuit of the abnormal condition signal transmitting device. Accordingly, it is necessary to extend a grounding line from the device and to connect it to the part of the tire wheel which is at ground level. This line connecting operation is rather troublesome in coupling the device to the tire.

Furthermore, in order to control the on-off operations of the transistors in association with the detecting operations of the abnormal condition detecting switches, it is necessary to provide one transistor for each abnormal condition detecting switch, which increases the number of components as much.

Another example of the abnormal detection signal transmitting device of this type is installed as follows: When the tire wheel is fixedly secured, for instance, to the hub of the axle of a motor vehicle, the device together with the tire is fixed with the hub nuts. In this case, the device includes electrically conductive brackets, which are fixedly secured with the hub nuts so that the body of the device is electrically connected to the wheel, thus forming abnormal condition detecting switches. When any one of the hub nuts is loosened for some reason, the respective bracket is electrically disconnected from the wheel; that is, the abnormal condition detecting switch is turned off. When any one of the abnormal condition detecting switches is turned off, it is determined that an abnormal condition has occurred with the tire, and an abnormal condition detection signal is transmitted outside.

The above-described conventional device is disadvantageous in the following points: That is, four brackets extended from the body of the device are secured to the wheel by tightening the hub nuts. Even if one of the hub nuts is loosened, the brackets fixedly secured with the remaining hub nuts are held stable; that is, the bracket whose hub nut has been loosened is not immediately electrically disconnected from the wheel, and therefore the abnormal condition is not immediately detected.

Furthermore, another example of the device of this type operates to detect abnormal conditions; that is, the loosening of any one of the hub nuts which fixedly secure the tire to the hub, or a reduction of the air pressure of the tire, to inform the user of the abnormal conditions. In the device, sensors are interposed between the hub and the hub nuts fixing the tire, to detect the contact state therebetween, and an air pressure sensor is provided to detect the air pressure of the tire. Furthermore, a signal transmitter is mounted on the wheel, to transmit the detection signals of those sensors, and a signal receiver is mounted on the motor vehicle, to receive the detection signals, so that, when an abnormal condition occurs with the tire, an alarm unit is operated to inform the user of the occurrence of the abnormal condition.

With the device, the difficulty can be eliminated that the hub nuts come off to allow the tire to come off, and a reduction of the air pressure of the tire can be detected. Those effects contribute to improvement of the safe operation of the motor vehicle.

The abnormal conditions of the tire are for instance as follows: One example of the abnormal conditions relates to how sufficiently the tire has been secured with the hub nuts; that is, the abnormal condition is such that, while the vehicle is traveling, the hub nuts fixing the tire are loosened or come off. In another example, the tire air pressure is decreased. In another example, while the vehicle is being parked, or the user is away from the vehicle, the tire is stolen. Thus, various abnormal conditions occur with the tire as the case may be.

In the case where, when the vehicle is being parked, and is not accompanied by the user, the hub nuts are loosened or come off, there may be a possibility that the tire has been stolen. On the other hand, if, when the vehicle is traveling, the same abnormal condition occurs, then the tire may come off, which may results in a serious accident. Thus, when, in the case where the vehicle is not accompanied by the user, an abnormal condition is detected with the tire, it is necessary for the vehicle to perform a warning operation, for instance, to operate the horn or the like to sound a warning signal outside or inform the user of the occurrence of the abnormal condition by radio. If, in this case, the user is in the vehicle, instead of the horn producing loud sound, a buzzer or lamp should be used to inform the user of the occurrence of the abnormal condition.

However, the above-described conventional device is unable to perform the warning operation separately according to the above-described various situations, because the signal transmitter mounted on the tire wheel merely transmits a signal indicating the abnormal condition of the tire. That is, in the case where the device is so designed as to operate the horn to give a warning signal, the device is disadvantageous in that, when the user is in the vehicle, the sound produced is too loud for him to bear. On the other hand, in the case where the device is so designed as to operate the buzzer to give a waning signal, the device suffers from the difficulty that, for instance when the tire is stolen, it is impossible to inform the user of it who is outside the vehicle.

SUMMARY OF THE INVENTION

In view of the foregoing, an object of this invention is to provide an abnormal condition signal transmitting device for a body of revolution, which needs no grounding line, and is relatively small in the number of transistors and low in manufacturing cost, and which can be mounted with ease.

Another object of the invention is to provide an abnormal condition detecting device for a tire, which quickly detects when hub nuts fixing the tire to the hub are loosened, and outputs an abnormal condition detection signal.

A further object of the invention is to provide a tire abnormal condition alarming device for a motor vehicle, which comprises a remote control unit simple in construction and low in manufacturing cost, which detects an abnormal condition of a tire, and performs warning operations separately according to the states of the motor vehicle.

An abnormal condition signal transmitting device for a body of revolution, according to the invention, comprises: at least two abnormal condition detecting switches which are turned off upon detection of an abnormal condition of the body of revolution; a DC source one of the terminals of which is grounded through one of the abnormal condition detecting; a switching element with a control terminal which is grounded through the other abnormal condition detecting switch and connected through bias means to the other terminal of the DC source; and an oscillator for outputting an abnormal condition detection signal as an aerial propagation signal when the switching element is turned on.

An abnormal condition detecting device for a tire, which, according to the invention, comprises: a plurality of abnormal condition detecting switches made up of a plurality of electrically conductive brackets which are connected to a body casing and are secured to the hub of a tire wheel with hub nuts through insulating layers interposed between the tire wheel and the brackets, the abnormal condition detecting switches being held turned on with the brackets electrically in contact with the hub nuts.

A tire abnormal condition alarming device for a motor vehicle provided with a remote control device including a signal receiver adapted to receive a door unlocking or locking aerial propagation signal from an operating key, in which a door locking mechanism is operated according to the signal reception of the signal receiver, to unlock or lock a door; in which, according to the invention, a signal transmitter is coupled to a tire of the motor vehicle which detects an abnormal condition of the tire to transmit an abnormal condition detection signal as an aerial propagation signal, and upon reception of the abnormal condition detection signal from the signal transmitter, the signal receiver causes alarming means to perform a warning operation.

The abnormal condition signal transmitting device according to the invention operates as follows: When no abnormal condition occurs with the body of revolution, all the abnormal condition detecting switches are held turned on. One of the abnormal condition detecting switches is held at a predetermined potential grounding one of the terminals of the DC source. The control terminal of the switching element is grounded through the other abnormal condition detecting switch, so that the bias voltage provided by the biasing means is made ineffective; that is, the switching element is held turned off. Accordingly, the oscillator is not activated; that is, the abnormal condition detection signal is not transmitted.

When the abnormal condition occurs with the body of revolution, the abnormal condition detecting switch turns from on state to off state on. As a result, at the time that at least one of abnormal condition detecting switches is turned off, the switching element is turned on to activate the oscillator so as to output the abnormal condition detection signal as an aerial propagation signal.

When the abnormal condition detecting switch grounding the DC source is turned off, the one terminal of the DC source is held at a floating potential. On the other hand, in this case, even when the control terminal of the switching element is grounded through the other abnormal condition detecting switch which is rendered conductive (on), the biasing means applies a relative potential difference across the control terminal and the terminal connected to the one terminal of the DC source, as a result of which the switching element is turned on to activate the oscillator. When the abnormal condition detecting switch grounding the control terminal of the switching element is turned off, similarly the biasing means applies the bias voltage to the switching element so that the latter is turned on to activate the oscillator.

The tire abnormal condition detecting device according to the invention operates as follows. In the case where the tire has been fixedly mounted with the hub nuts, the latter are in close contact with the brackets, and therefore the body casing is electrically connected through the hub nuts to the tire wheel; that is, the abnormal condition detecting switches are held turned on. If, under this condition, any one of the hub nuts is loosened, the respective abnormal condition detecting switch is turned off as follows: That is, even if the bracket is in contact with the tire wheel, the former is electrically insulated from the latter by the insulating layer. When, under this condition, the hub nut is loosened, then the bracket is electrically disconnected from the hub nut thus loosened, so that the abnormal condition detecting switch is turned off, thus indicating the abnormal condition of the tire; i.e., the loosening of the latter is detected.

The vehicle tire abnormal condition warning device having the remote control unit according to the invention operates as follows: When an abnormal condition occurs with the tire, then the signal transmitter transmits the aerial propagation signal indicating the occurrence of the abnormal condition to the signal receiver. In response to the aerial propagation signal from the signal transmitter, the signal receiver causes the alarming means to perform a warning operation. In this case, the signal receiver normally drives the door locking mechanism according to a door locking or unlocking aerial propagation signal from the remote control unit, to perform a door locking or unlocking operation. More specifically, the warning operation is performed for the interior of the vehicle and for the exterior separately according to the driving states of the door locking mechanism; that is, different warning operations are carried out selectively according to whether or not the user is in the parked vehicle.

BRIEF DESCRIPTION OF THE DRAWINGS

FIG. 6 is a flow chart showing a security program executed by the abnormal condition signal transmitting device.

DETAILED DESCRIPTION OF THE PREFERRED EMBODIMENTS

One embodiment of this invention, an abnormal condition signal transmitting device for detecting the abnormal conditions of a tire, to which the technical concept of this invention is applied, will be described with reference to the accompanying drawings.

Figure 2:
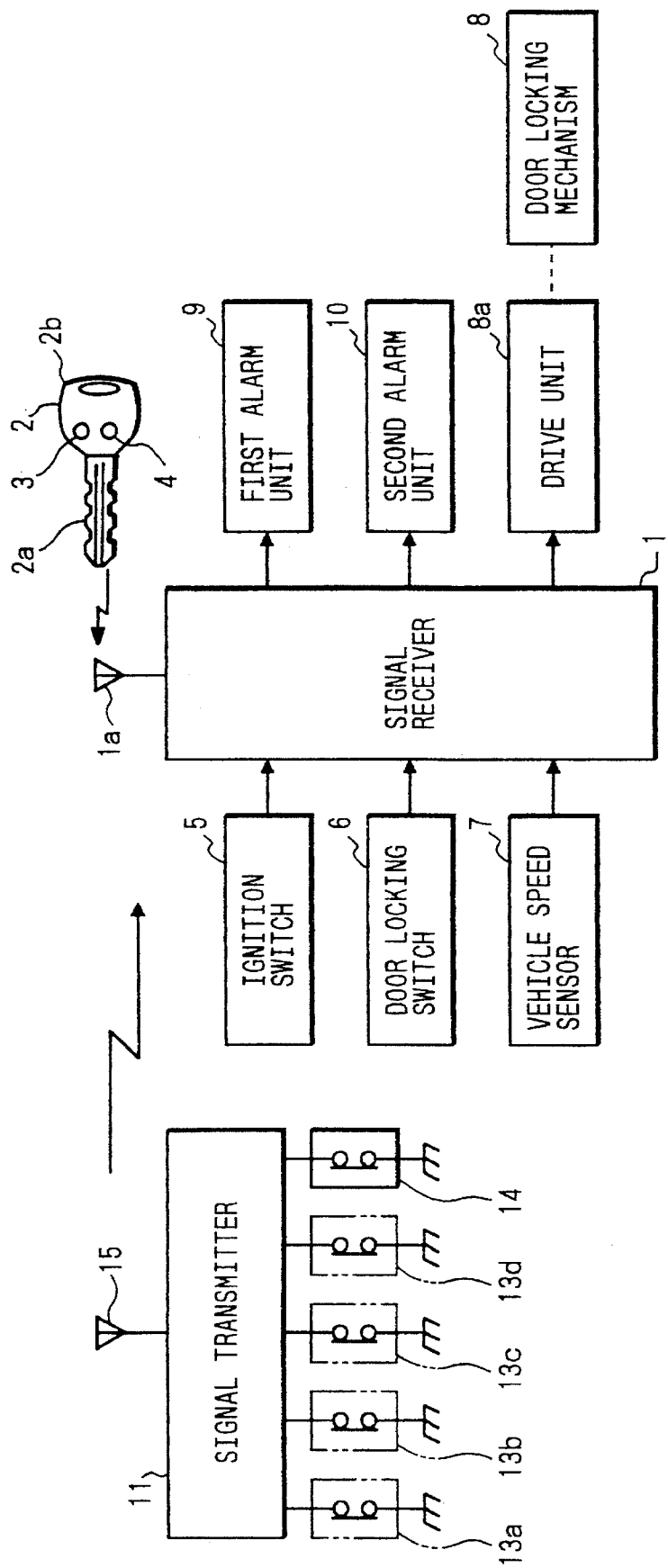
FIG. 2 is a block diagram showing the whole arrangement of the abnormal signal transmitting device.

FIG. 2 outlines the whole arrangement of the abnormal condition signal transmitting device.

In FIG. 2, reference numeral 1 designates a signal receiver 1 comprising a microcomputer, a ROM (read-only memory) and a RAM (random access memory), in which programs have been stored. The signal receiver is mounted on the body of a motor vehicle, and operates as described below. An operating key, namely, a radio wave key 2 comprises: a key plate 2a which is inserted into the key cylinder of the motor vehicle and turned; and a key grip 2b with a lock switch 3 and an unlock switch 4. A key signal transmitting circuit is provided inside the key grip 2b, which transmits a door lock signal in response to the depression (operation) of the lock switch 3 or a door unlock signal in response to the depression of the unlock switch 4.

The signal receiver 1 has an antenna 1a to receive the radio wave signal from the radio wave key 2. The signal receiver 1 has input terminals, which are connected to an ignition switch 5 provided near the driver's seat of the motor vehicle, door locking switches 6 provided at the doors of the motor vehicle, and a vehicle speed sensor 7 for detecting the speed of the vehicle, respectively. The output terminals of the signal receiver 1 are connected to a drive unit 8a adapted to drive a door locking mechanism 8, and to first and second alarm units 9 and 10, respectively. The first alarm unit 9 is made up of a buzzer or the like installed inside the vehicle, to produce sound to the extent that only the passengers inside the vehicle can hear it; whereas the second alarm unit 10 is made up of a horn installed on the vehicle, to produce the sound which is loud enough for persons outside the vehicle to hear. At any rate, both of the alarm units 9 and 10 function to produce warning signals.

Figure 1:
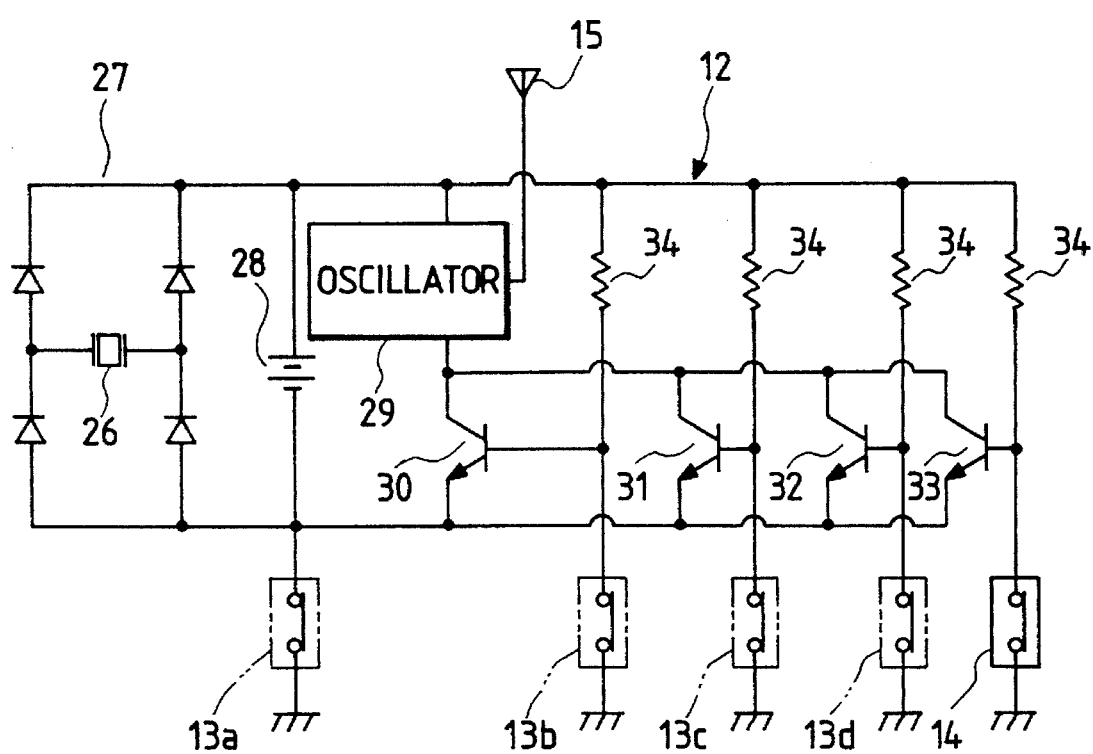
FIG. 1 is an electrical circuit diagram showing the arrangement of a signal transmitting circuit in an abnormal condition signal transmitting device, which constitutes one embodiment of this invention.

Further in FIG. 2, reference numeral 11 designates a signal transmitter which detects the abnormal condition of a tire, and outputs an abnormal condition detection signal as a radio wave signal. The signal transmitter comprises: a signal transmitting circuit 12 (FIG. 1); four abnormal condition detecting switches 13a through 13d; an air pressure sensor 14; and an antenna 15. More specifically, the terminals of the signal transmitting circuit 12 are electrically grounded through the four abnormal condition detecting switches 13a through 13d and the air pressure sensor 14. The abnormal condition detecting switches 13a through 13d, and the air pressure sensor 14 are held turned on when no abnormal condition is detected with the tire; whereas they are turned off when an abnormal condition is detected. In response to the on-off operations of the switches and the sensor, the signal transmitting circuit 12 transmits the abnormal condition detecting signal.

Figure 3:
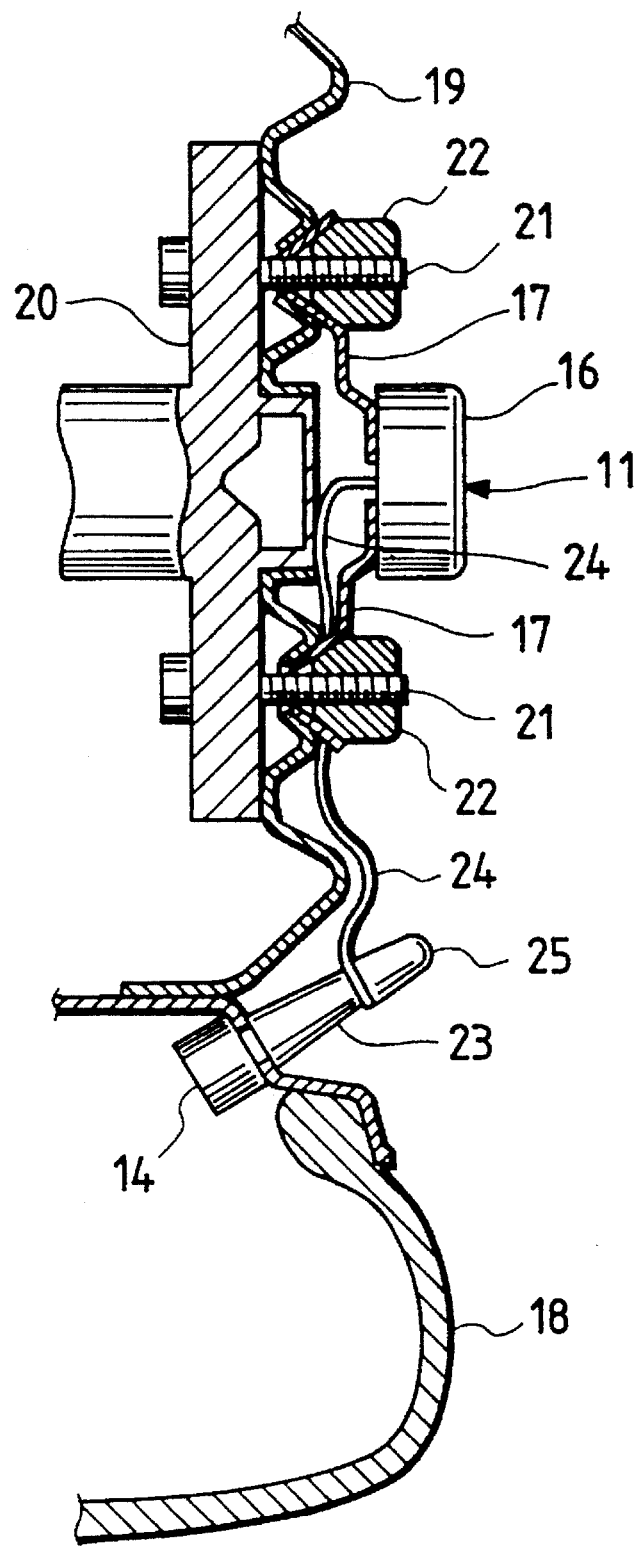
FIGS. 3 and 4 are a vertical sectional view and a front view, respectively, showing a signal transmitter mounted on a tire.
Figure 4:
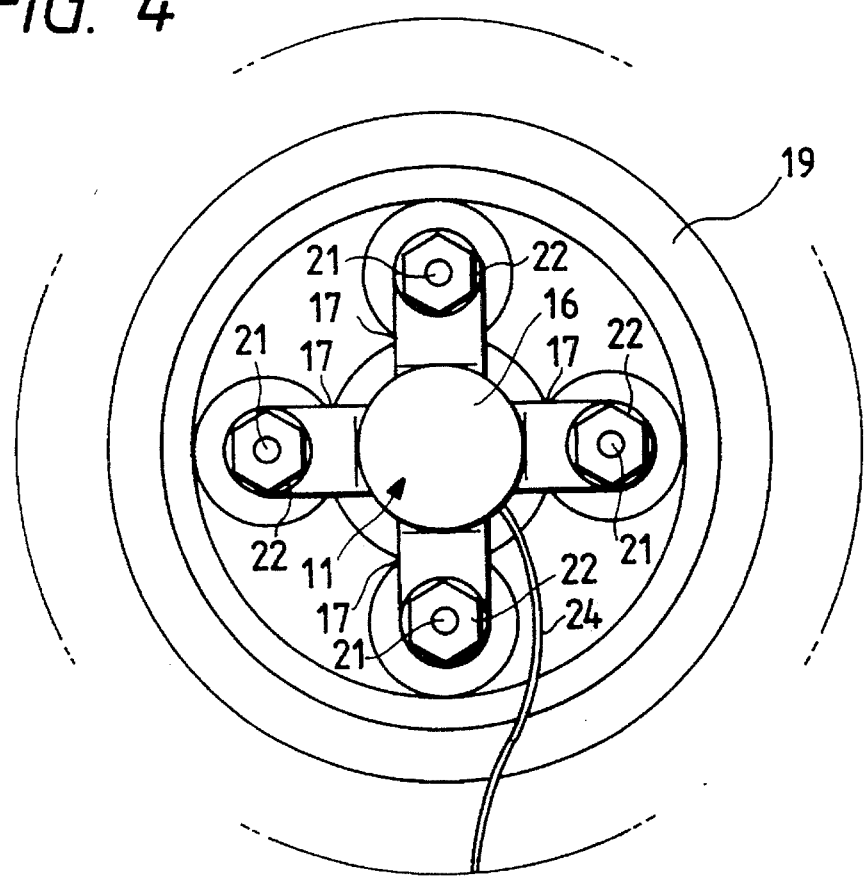
Figure 5:
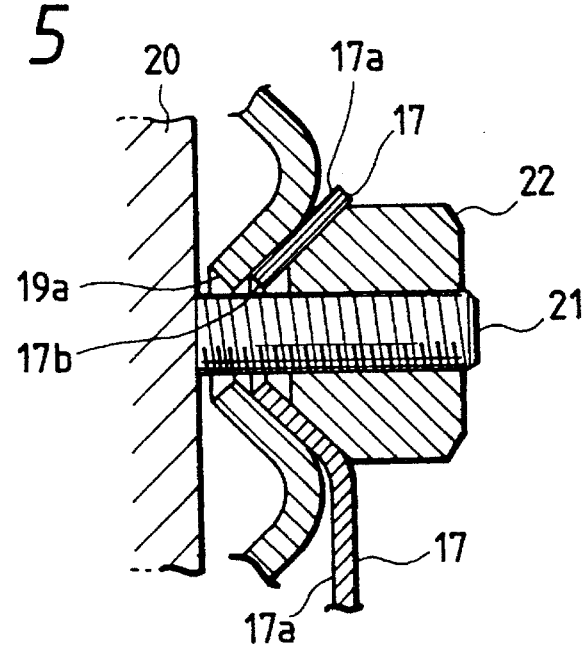
FIG. 5 is a vertical sectional view showing how the end portion of a bracket secured to the signal transmitter is mounted on a tire wheel.

Now, the construction of the signal transmitter 11 will be described with reference to FIGS. 3 through 5.

The signal transmitting circuit 12 is accommodated in a flat, cylindrical casing 16. Four brackets 17, which serve as mounting members and as the abnormal condition detecting switches 13a through 13d, are connected to the bottom of the casing 16 in such a manner that they are extended radially outwardly therefrom. Each of the brackets 17 is made of an electrically conductive material, and an insulating layer 17a is formed on the rear surface of the end portion of the bracket 17, as shown enlarged in FIG. 5. An inserting hole 17b is formed in the end portion of each of the brackets 17.

A tire 18 of the motor vehicle is fixedly secured to the wheel 19 by engaging four hub nuts 22 with four hub bolts 21 which are protruded from a hub 20 provided at the end of an axle of the motor vehicle. More specifically, the hub bolts 21 are inserted into inserting holes 19a formed in the wheel 19, and into the inserting holes 17a of the four brackets 17 so that the four brackets 17 are held between the wheel 19 and the hub nuts 22, and then the hub nuts 22 are tightened to secure the tire 18 to the wheel 19.

Thus, the signal transmitter 11 has been mounted outside the central portion of the wheel 19, and the brackets 17 held pushed against the hub nuts 22; that is, the former 17 are electrically connected to the latter 22. The brackets 17 are pushed against the wheel 19; however, the former 17 are electrically insulated from the latter 19 by the insulating layers 17a provided therebetween. Thus, the brackets 17 are electrically connected through the hub nuts 22, the hub bolts 21 and the hub 20 to the vehicle body; that is, they are grounded. The brackets 17 and the hub nuts 22 form the aforementioned abnormal condition detecting switches 13a through 13d. When no abnormal condition occurs with the tire, the abnormal condition detecting switches are in "on" state; and if an abnormal condition occurs with the tire—for instance the hub nuts 22 are loosened or come off, then the brackets 17 are spaced apart the hub nuts 22; that is, the brackets 17 are not grounded, so that the switches are turned off.

The air pressure sensor 14 is set on the periphery of the wheel 19 in such a manner that it is located inside the tire 18. The air pressure sensor 14 has a valve 23 which is extended outside the wheel. One end of a connecting cable 24 is connected to the valve 23, and a cap 25 is put on the latter 23. The other end of the connecting cable 24 is connected to the connecting terminal of the signal transmitting circuit 12; that is, the air pressure sensor 14 is electrically connected to the signal transmitting circuit 12. The air pressure sensor 14 is designed as follows: When the air pressure of the tire 18 is normal, at a predetermined value or higher, it grounds the connecting cable 14 through the wheel 19; and when the air pressure of the tire is lower than the predetermined value, it electrically disconnects the connecting cable 24 from the wheel 19.

Now, referring back to FIG. 2, the electrical arrangement of the signal transmitting circuit 12 will be described.

A piezo-electric element 26 utilizes vibrations due to the rotation of the tire 18, to produce voltage, and its two terminals are connected to the AC input terminals of a bridge-connected rectifier circuit 27. The DC output terminals of the rectifier circuit 27 are connected to the two terminals of a DC source, namely, a secondary battery 28. That is, the AC output of the piezo-electric element 26 is converted into a DC output, which charges the secondary battery 28.

A signal generator, namely, an oscillator 29 outputs a radio wave signal indicating the abnormal condition of the tire 18, and transmits it through the antenna 15. The positive power input terminal of the oscillator 29 is connected to the positive terminal of the secondary battery 28, and the negative power input terminal thereof is connected to the negative terminal of the secondary battery 28 through the collectors and emitters of four transistors 30 through 33. The control terminals of those transistors 30 through 33, namely, the bases of them are connected through bias means, namely, bias resistors 34 to the positive terminal of the secondary battery 28. When any one of the transistors 30 through 33 is rendered conductive (on), the oscillator 29 is energized by the secondary battery 28 through it, to output the abnormal condition detection signal.

The aforementioned abnormal condition detecting switches 13a through 13d are connected as follows: The abnormal condition detecting switch 13a is connected to the negative terminal of the secondary battery 128, and the remaining abnormal condition detecting switches 13b, 13c and 13d are connected to the bases of the transistors 30, 31 and 32, respectively. The connecting cable 24 connected to the air pressure sensor 14 is connected to the base of the transistor 33.

The operation of the device thus constructed will be described with reference to FIGS. 1 through 5, and to FIG. 6, a flow chart.

First, the operating principle of the signal transmitter 11 will be described.

The signal transmitting circuit 12 is grounded through the four abnormal condition detecting switches 13a through 13d, and the air pressure sensor 14. Hence, in the case where the hub nuts 22 adapted to fixedly secure the wheel 19 of the tire 18 are fixed sufficiently, and the air pressure of the tire 18 is normal, the switches 13a through 13d and the air pressure sensor 14 are all in "on" state, and the emitters and bases of the transistors 30 through 33 are at the ground level, or at the same level. Accordingly, the transistors 30 through 33 are all non-conductive (off), and therefore the oscillator 29 is not energized by the secondary battery 28; that is, it outputs no abnormal condition detection signal.

When, under this condition, one of the hub nuts 22 is loosened or comes off, it is electrically disconnected from the respect bracket 17, as a result of which the respective abnormal condition detecting switch is turned off. For instance in the case where the abnormal condition detecting switch 13a is turned off, the negative terminal of the secondary battery 28 is electrically disconnected from ground. As a result, bias voltages are applied through the bias resistors 34 across the bases and emitters of the transistors 30 through 33, so that the latter 30 through 33 are rendered conductive. Hence, the oscillator 29 is energized by the battery, to transmit the abnormal condition detection signal through the antenna 15.

When any one of the abnormal condition detecting switches 13b, 13c and 13d or the air pressure sensor 14 is turned off, the base of the respective transistor (30, 31, 32 or 33) is electrically disconnected from ground, so that the bias voltage is applied across the base and emitter of the transistor through the bias resistor 34. As a result, the transistor is rendered conductive (on). Thus, similarly as in the above-described case, the oscillator 29 is energized by the battery, to transmit the abnormal condition detection signal through the antenna 15.

When the signal receiver 1 is energized by a vehicle battery (not shown) or the like, it executes a security program shown in FIG. 6. First, in Step S1, the signal receiver 1 determines whether or not the motor vehicle is driving. When it is determined that the motor vehicle is driving; or when the result of determination is "YES", Step S2 is effected. In Step S2, it is determined whether or not the signal receiver receives the abnormal condition detection signal from the signal transmitter 11. When it is determined that no abnormal condition detection signal is received; that is, the result of determination is "NO", Step S1 is effected again. When, on the other hand, it is determined that the abnormal condition detection signal is received; that is, the result of determination is "YES", Step S3 is effected.

The fact that, in Step S2, the result of determination by the signal receiver 1 is "YES" means that, while the vehicle is driving, the hub nut 22 of the tire 18 has been loosened or come off, or the tire air pressure is decreased. Hence, in Step S3, the signal receiver operates the first alarm unit 9 to inform the operator of the abnormal condition. Thereafter, Step S1 is effected again.

In the case where the vehicle is at rest (not driving), in Step S1 the result of determination is "NO", and Step S4 is effected. In Step S4, the signal receiver 1 determines whether or not it has received the door lock signal from the radio wave key 2. When it is determined that the signal receiver 1 has not received the door lock signal, Step S5 is effected. In Step S5, the signal receiver 1 determines whether or not it has received the door unlock signal from the radio wave key 2. When it is determined that the signal receiver 1 has not received the door unlock signal, Step S6 is effected. In Step S6, the signal receiver 1 determines whether or not it has received the tire abnormal condition detection signal from the signal transmitter 11. When it is determined that the signal receiver 1 has not received the tire abnormal condition detection signal, Step S1 is effected again. That is, Steps S1, S4, S5 and S6 are effected again.

When, under this condition, the operator gets off the motor vehicle, and closes the door, and depresses the lock switch 3 of the radio wave key 2, then the signal receiver 1 determines that it has received the door lock signal in Step S4; that is, the result of determination is "YES", and Step S7 is effected. In Step S7, it is determined whether or not the door has been closed. When it is determined that the door has been closed; that is, the result of determination is "YES", Step S8 is effected. In Step S8, the signal receiver applies a locking signal to the drive unit 8a to cause the door locking mechanism 8 to lock the door. When in Step S7 the result of determination is "NO", Step S1 is effected again.

After Step S8; that is, after the signal receiver 1, in response to the lock signal from the radio wave key 2, has caused the door locking mechanism to lock the door, an alert mode is started beginning with Step S9. In Step S9, the signal receiver 1 determines it from the output signal of the door locking switch 6 whether or not the door has been opened. When the door has been closed; that is, when the result of determination is "NO", Step S10 is effected. In Step S10, it is determined whether or not the signal receiver 1 has received the abnormal condition detection signal from the signal transmitter 11. When the signal receiver has not received the signal yet; that is, when the result of determination is "NO", then Step S11 is effected. In Step S11, the signal receiver 1 determines whether or not it has received the door unlock signal from the radio wave key 2. When the signal receiver has not received the signal yet; that is, when the result of determination is "NO", then Step S9 is effected again. That is, Steps S9 to S11 are effected again.

If Steps S9 through S11 are repeated effected, it means that the motor vehicle, being parked, is not accompanied by the operator. In this case, the signal receiver 1 is placed in the alert mode to prevent car theft. Hence, for instance in the case where, although the door is opened, the signal receiver receives no unlock signal from the radio wave key 2, in Step S9 it is determined that an abnormal thing has occurred with the vehicle, and Step S12 is effected. In Step S12, the signal receiver applies an informing signal to the second alarm unit 10 to inform persons outside the vehicle of the occurrence of the abnormal thing with the vehicle. When the signal receiver 1 has received the tire abnormal condition detection signal from the signal transmitter 11, in Step S10 the result of determination is "YES", and therefore Step S12 is effected. Similarly as in the above-described case, the second alarm unit 10 is operated.

When the signal receiver 1 receives the unlock signal from the radio wave key 2 while Steps S9 through S11 being repeatedly effected, in Step S11 it is determined that the signal receiver has received the unlock signal; that is, the result of determination is "YES", so that Step S13 is effected. In Step S13, the signal receiver 1 applies an unlock signal to the drive unit 8a to cause the door locking mechanism 8 to perform the unlocking operation. Thereafter, Step S1 is effected again, and the above-described Steps are repeated all over again.

When, in order to lock the door of the vehicle, the lock switch 3 of the radio wave key 2 is operated to transmit the door lock signal, the signal receiver is placed in the alert mode, to effect Steps S9 to S11. For instance when the door is mechanically locked with the key plate 2a of the radio wave key 2, the signal receiver 1 repeatedly carries out the operations of Steps S1, S4, S5 and S6. In this case, even when the signal transmitter 11 has transmitted the tire abnormal condition detection signal, no warning alarm is produced for persons outside the vehicle. Furthermore, if, under this condition, the signal receiver 1 receives the door unlock signal from the radio wave key 2, the signal receiver 1 determines it in Step S5 that it has received the door unlock signal; that is, the result of determination is "YES", and Step S13 is effected. In Step S13, the door locking mechanism performs a door unlocking operation. Thereafter, Step S1 is effected again.

As was described above, in the embodiment of the invention, the signal transmitting circuit 12 of the signal transmitter 11 is provided with the abnormal condition detecting switches 13a through 13d designed as described above, and is grounded only through those detecting switches 13a through 13d and the air pressure sensor 14. Hence, when any one of the switches is turned off, it can be detected positively. Furthermore, in the device of the invention, the four transistors 30 through 33 are provided for the five detecting switches; that is, the number of transistors is smaller by one than the number of detecting switches.

In the embodiment, the brackets 17 form the abnormal condition detecting switches 13a through 13d, and the insulating layers 17a are formed on the surfaces of the brackets 17 which are confronted with the wheel 19. Hence, the switch formed by each of the brackets 17 is operated (opened and closed) depending on whether or not the bracket is in contact with the hub nut 22. When the hub nut 22 is loosened, it is insufficiently in contact with the bracket 17 or electrically disconnected from the latter 17, and therefore the loosening of the hub nut 22 can be detected quickly.

Furthermore, in the embodiment of the invention, the abnormal condition detection signal transmitted by the signal transmitter to indicate the abnormal condition of the tire 18 is received by the signal receiver which is adapted to receive the door lock signal or door unlock signal from the radio wave key 2. Hence, it is unnecessary to additionally provide a signal receiver to receive the abnormal condition detection signal, and accordingly the manufacturing cost of the device can be reduced as much.

With the device of the invention, in response to the tire abnormal condition detection signal received by the signal receiver 1, the first alarm unit 9 or the second alarm unit 10 is operated according to the present state of the motor vehicle, to produce a warning sound inside or outside the vehicle. Hence, the user is suitably informed of the abnormal condition, which improves the security of the vehicle, and is effective in preventing the occurrence of car theft.

Furthermore, in the above-described embodiment of the invention, the first and second alarm units 9 and 10 are made up of a buzzer and a horn, respectively; however, the invention is not limited thereto or thereby. That is, for instance they may be so designed as to use radio wave signals to output alarm signals, or they may be so designed that, during night time, the headlamp is flickered to inform the user of the occurrence of the abnormal condition.

In addition, in the above-described embodiment, the brackets 17 are electrically insulated from the wheel by the insulating layers 17a formed on the end portions of the brackets 17; however, the invention is not limited thereto or thereby. That is, instead of the insulating layer 17a, an insulating ring may be employed in such a manner that it is interposed between the wheel 19 and the bracket 17. Alternatively, an insulating layer may be formed on the portion of the wheel 19 which is brought into contact with the brackets.

As was described above, in the abnormal condition signal transmitting device for the body of revolution, at least two abnormal condition detecting switches are provided, and one of the two terminals of the DC source is grounded through one of the abnormal condition detecting switches, and the control terminal of the switching element to which the bias voltage is applied through the biasing means is grounded through the other abnormal condition detecting switch. Hence, whichever abnormal condition detecting switch is turned off detecting the abnormal condition of the body of revolution, the oscillator is activated. In the device, no grounding line is provided, and the number of transistors is relatively small. Thus, the device is low in manufacturing cost, and its mounting operation can be achieved with ease.

On the other hand, in the tire abnormal condition detecting device according to the invention, the insulating layer is formed on the end portion of each of the brackets which is brought into contact with the wheel, so that only the contact of the bracket with the hub nut can be detected. Hence, when the hub nut is loosened; that is, when the hub nut is insufficiently in contact with the bracket, it is quickly detected. This feature should be highly appreciated.

Furthermore, in the tire abnormal condition alarming device for a motor vehicle provided with the remote control device, the signal transmitter is provided to transmit the abnormal condition detection signal upon detection of the abnormal condition of the tire, and upon reception of the abnormal condition detection signal from the signal transmitter, the signal receiver causes the alarming means to perform the warning operation. Hence, in the device, it is unnecessary to additionally provide receiving means for the signal transmitter; that is, the aerial propagation signal indicating the abnormal condition of the tire can be received at low cost. On the other hand, the signal receiver is able to detect the locking or unlocking of the door. Hence, the different warning operations can be performed separately according to the different states of the vehicle that the operator is in the parked vehicle, and he is not in it. This effect also should be highly appreciated.

What is claimed is:

1. A tire abnormal condition alarming system for a vehicle comprising:

a remote control device including:
      a signal receiver for receiving a door unlocking or locking aerial propagation signal from an operating key;
      a door locking mechanism operated according to the signal reception of the signal receiver, to unlock or lock a door;
      a signal transmitter coupled to a tire of the motor vehicle, the signal transmitter detecting an abnormal condition of the tire to transmit an abnormal condition detection signal as an aerial propagation signal to the signal receiver; and
      alarming means for performing a warning operation to inform the occurrence of the abnormal condition of the tire by operating the signal receiver upon reception of the abnormal condition detection signal from the signal transmitter.

2. A tire abnormal condition alarming system for a vehicle as claimed in claim 1, wherein the signal transmitter includes:

at least two abnormal condition detecting switches turned off upon detection of an abnormal condition of the tire;
   a DC source having one of its terminals grounded through one of the abnormal condition detecting switches;
   a switching element with a control terminal which is grounded through another of the abnormal condition detecting switches and is connected through bias means to another terminal of the DC source; and
   an oscillator for outputting the abnormal condition detection signal as an aerial propagation signal when the switching element is turned on.

3. A tire abnormal condition alarming system for a vehicle as claimed in claim 2, wherein the abnormal condition detecting switches include:

a plurality of electrically conductive brackets which are connected to a body casing and are secured to a hub of the tire with hub nuts through insulating layers interposed between the tire and the brackets,
   wherein the abnormal condition detecting switches are held turned on with the brackets electrically in contact with the hub nuts.

4. A tire abnormal condition alarming system for a vehicle as claimed in claim 1, wherein the alarming means is operated according to a current state of the tire.

5. An abnormal condition detecting device for a tire comprising:

at least two abnormal condition detecting switches turned off upon detection of an abnormal condition of the tire;
   a DC source having one of its terminals grounded through one of the abnormal condition detecting switches;
   a switching element with a control terminal which is grounded through another of the abnormal condition detecting switches and is connected through a bias element to another terminal of the DC source; and
   an oscillator for outputting an abnormal condition detection signal as an aerial propagation signal when the switching element is turned on.

6. An abnormal condition detecting device for a tire as claimed in claim 5, wherein the abnormal condition detecting switches include:

a plurality of electrically conductive brackets which are connected to a body casing and are secured to a hub of the tire with hub nuts through insulating layers interposed between the tire and the brackets,
   wherein the abnormal condition detecting switches are held turned on with the brackets electrically in contact with the hub nuts.

* * * * *